(12) United States Patent
Xiao et al.

(10) Patent No.: US 8,249,560 B2
(45) Date of Patent: Aug. 21, 2012

(54) SENDING METHOD, RECEIVING METHOD, AND SYSTEM FOR EMAIL TRANSFER BY SHORT MESSAGE

(75) Inventors: Yong-Hui Xiao, Shenzhen (CN); Hong-Liang Liu, Shenzhen (CN); Yi-Fang Wu, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 476 days.

(21) Appl. No.: 12/436,037

(22) Filed: May 5, 2009

(65) Prior Publication Data
US 2010/0120454 A1    May 13, 2010

(30) Foreign Application Priority Data
Nov. 10, 2008    (CN) .......................... 2008 1 0305464

(51) Int. Cl.
*H04M 3/16* (2006.01)
(52) U.S. Cl. .................. 455/412.1; 455/412.2; 455/413; 455/414.4; 455/414.3; 709/223; 709/203; 709/217; 709/224; 707/812

(58) Field of Classification Search .................... 455/466
See application file for complete search history.

(56) References Cited

U.S. PATENT DOCUMENTS

| 7,409,428 | B1 * | 8/2008 | Brabec et al. ................. 709/206 |
| 7,493,381 | B2 * | 2/2009 | Garg ............................. 709/223 |
| 7,559,030 | B2 * | 7/2009 | Ryu .............................. 715/752 |
| 2006/0143282 | A1 * | 6/2006 | Brown et al. ................. 709/217 |

* cited by examiner

*Primary Examiner* — Olumide T Ajibade Akonai
*Assistant Examiner* — Randy Peaches
(74) *Attorney, Agent, or Firm* — Altis Law Group, Inc.

(57) ABSTRACT

A system and method are used for sending and receiving email. The system includes a gateway. The gateway communicates with the mobile phone via a wireless network capable of receiving a short message sent from a mobile phone. The gateway is connected to a mail server which has a plurality of mailboxes via a network. The gateway is capable of communicating between the mobile phone and the mail server in such a manner that the gateway converts the short message to an email, and sends the email to a receiver's mailbox in the mail server whose address is included in the short message, and the gateway converts the emails of the mailboxes of the mail server to short messages, and sends the short messages to the corresponding mobile phones.

3 Claims, 3 Drawing Sheets

SENDING METHOD, RECEIVING METHOD, AND SYSTEM FOR EMAIL TRANSFER BY SHORT MESSAGE

BACKGROUND

1. Technical Field

The disclosure relates to communications technology, and particularly to transfer of email by short message.

2. Description of Related Art

Currently, users may access the Internet through personal mobile devices such as a Personal Digital Assistant ("PDA"), mobile phone, pager, or other. Users may also receive alerts and predetermined notifications, such as stock information and other event notices. However, the amount of information received may be limited due to hardware and network limitations. For example, email transferred over the Internet may be accompanied by large attachments. When a mobile phone is used to access the Internet to receive email, the attachments are also transmitted, wasting bandwidth and time.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
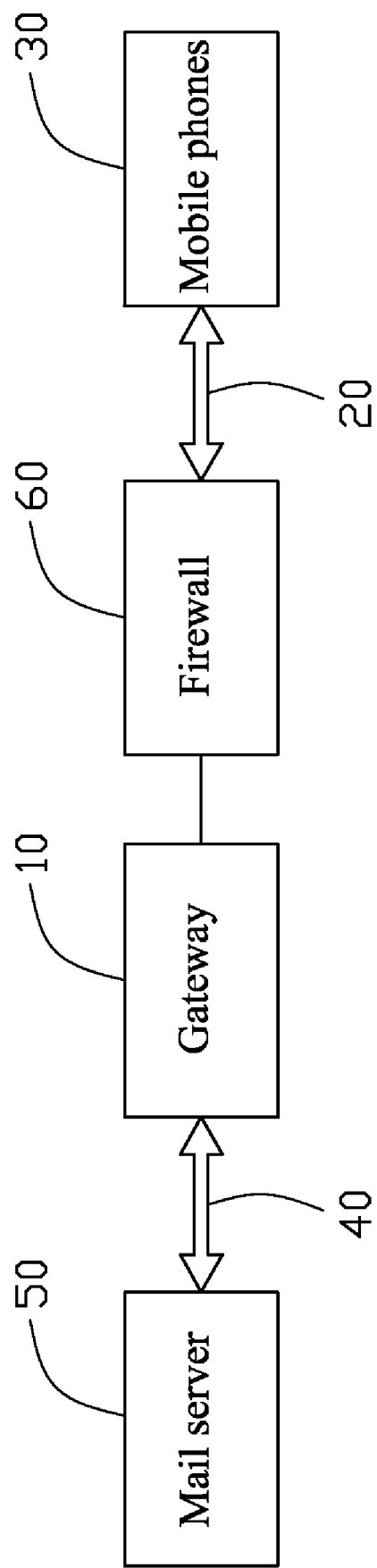
FIG. 1 is a block diagram of a system for email transmission by short message.

Referring to FIG. 1, a system for email transmission by short message includes a gateway 10, a mail server 50, and a plurality of mobile phones 30. Each mobile phone 30 has a unique mobile phone number. The gateway 10 is connected to the mail server 50 via Internet network 40. The plurality of mobile phones 30 is connected to the gateway 10 via a wireless network 20. Here, the wireless network 20 can be a GSM network, or a CDMA network, or other wireless networks. A firewall 60 is connected between the mobile phones 30 and the gateway 10 for security.

A plurality of user accounts are registered in the gateway 10. Every user account includes information such as the user's mobile phone number, mailbox address corresponding to the user's mobile phone number, mailbox password, and other information. Typically mailboxes are located in mail servers or other servers on the Internet. In the present embodiment, all users' mailboxes are located in the mail server 40.

The gateway 10 works as a bridge between the mobile phones 30 and the gateway 10 via which the mobile phones 30 send and receive short messages. For the gateway 10 to conveniently process multiple short messages from the mobile phones 30, the short messages must comply with a given format. For example, the short message can be written with the following format: "sender: xxxx; receiver: xxxx; cc: xxxx; subject: xxxx; content: xxxx", where "xxxx" represents contents of different parts of the short message. The short messages also can comply with other formats.

Additionally, to process some relational short messages, the described format can add an identifier, whereby the format will be: "sender: xxxx; receiver: xxxx; cc: xxxx; identifier: xxxx; subject: xxxx; content: xxxx". When two short messages have the same identifier, the two short messages are related, for example, an original short message and a reply message. When the gateway 10 receives a short message which includes an identifier, the gateway 10 records the identifier and related parts of the short message corresponding to the identifier, such as sender, receiver, or other. After the gateway 10 has recorded the identifier, the format of the relational short messages can be simplified to "identifier: xxxx; content: xxxx".

Figure 2:
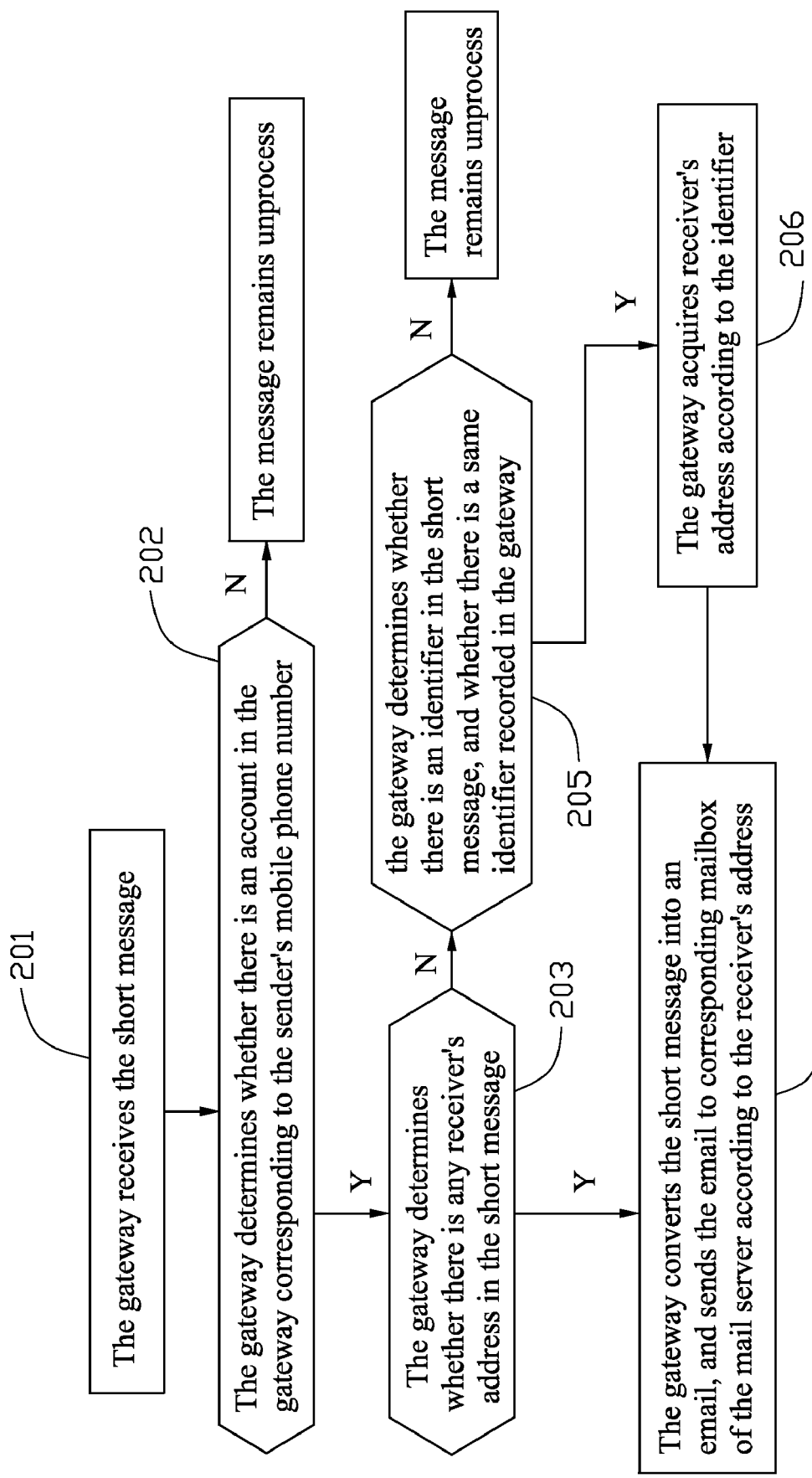
FIG. 2 is a flowchart of a method of sending email via the system of FIG. 1.

Referring to FIG. 2, a method of transmitting email by short messages of the disclosure includes, as shown, sending a short message using the system of FIG. 1 as follows:

In step 201, the gateway 10 receives the short message, and in step 202, the gateway 10 determines whether there is an account in the gateway 10 corresponding to the sender's mobile phone number, if not, the message remains unprocessed.

In step 203, if an account in the gateway corresponds to the sender's mobile phone number, the gateway 10 determines whether a receiver's address appears in the short message, and, if so, step 204 is implemented, and if not, step 205 is implemented.

In step 204, the gateway 10 converts the short message to an email and sends the email to a mailbox of the mail server 50 corresponding to the receiver's address;

In step 205: the gateway 10 determines whether an identifier appears in the short message, and whether the same identifier is recorded in the gateway 10. If so, step 206 is implemented, and if not, the short message remains unprocessed.

In step 206, the gateway 10 acquires a receiver address according to the identifier, and step 204 is implemented.

Figure 3:
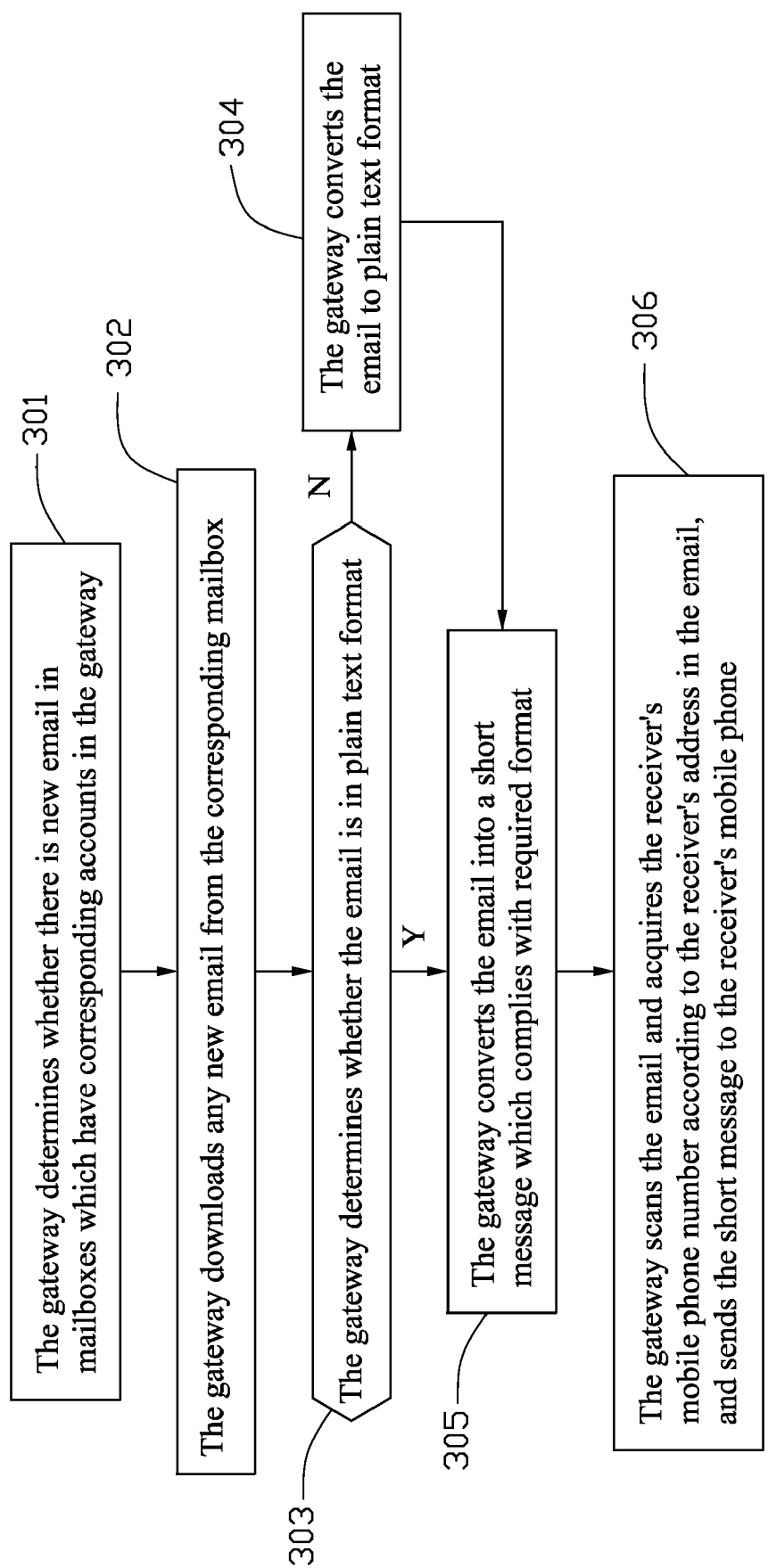
FIG. 3 is a flowchart of a method of receiving email via the system of FIG. 1.

Referring to FIG. 3, a method of transmitting email by short messages of the disclosure includes, as shown, receiving an email using the system of FIG. 1 as follows:

In step 301: the gateway 10 determines whether there is new email in mailboxes which have corresponding accounts in the gateway 10; and, if so, step 302 is implemented.

In step 302, the gateway 10 downloads any new email from the corresponding mailbox, then moves to step 303.

In step 303, the gateway 10 determines whether the email is in plain text format, and, if so, step 305 is implemented, and if not, step 304 is implemented.

In step 304, the gateway 10 converts the email to plain text format, then move to step 305.

In step 305, the gateway 10 converts the email to a short message which complies with required format.

In step 306, the gateway 10 scans the email and acquires the receiver's mobile phone number according to the receiver's address in the E-mail, and sends the short message to the receiver's mobile phone 30.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method, the method comprising following steps:
providing a gateway capable of communicating with a mobile phone, the gateway having an account corresponding to the mobile phone number, the gateway is connected to a mail server having a mailbox corresponding to the mobile phone number;
the gateway determines whether there is new email in the mailbox;
if there is new email, the gateway downloads the email from the mail server;
the gateway converts the email into a short message;
the gateway scans the email and retrieves a receiver's address from the email, the gateway searches for the receiver's mobile phone number according to the receiver's address, and the gateway sending the short message to the receiver's mobile phone;
before the gateway converts the email to a short message, the gateway determines whether the new email is in plain text format; if the new email is not in plain text format, the gateway converts the new email to plain text format.

2. The method of claim 1, wherein the gateway communicates with the mobile phone via a wireless network, and the gateway is connected to the mail server via Internet network.

3. The method of claim 2, wherein the wireless network is a GSM network or a CDMA network.

* * * * *